US006235961B1

(12) United States Patent
Kurukchi

(10) Patent No.: US 6,235,961 B1
(45) Date of Patent: May 22, 2001

(54) PROCESS FOR PRETREATING CRACKED GAS BEFORE CAUSTIC TOWER TREATMENT IN EHTYLENE PLANTS

(75) Inventor: Sabah A. Kurukchi, Houston, TX (US)

(73) Assignee: Stone & Webster Engineering Corporation, Boston, MA (US)

( * ) Notice: Subject to any disclaimer, the term of this patent is extended or adjusted under 35 U.S.C. 154(b) by 0 days.

(21) Appl. No.: 09/239,656

(22) Filed: Jan. 29, 1999

(51) Int. Cl.$^7$ .............................. C07C 7/00; B01D 53/14
(52) U.S. Cl. .............................. 585/854; 208/81; 208/82; 423/234; 423/243.01; 423/243.08; 95/199; 95/223; 95/235; 95/26
(58) Field of Search ........................ 208/81, 82; 585/854, 585/860; 423/228, 229, 234, 243.01, 243.08; 95/199, 223, 235, 236

(56) References Cited

U.S. PATENT DOCUMENTS

| 2,176,196 | * | 10/1939 | Beamer et al. | 423/234 |
|---|---|---|---|---|
| 3,679,765 | * | 7/1972 | Houston, Jr. et al. | 405/128 |
| 4,158,045 | * | 6/1979 | Schaffer et al. | 423/245.2 |
| 4,395,385 | | 7/1983 | Welsh | 423/234 |
| 4,603,035 | | 7/1986 | Connell et al. | 423/226 |
| 5,160,425 | * | 11/1992 | Lewis | 208/95 |
| 5,220,104 | * | 6/1993 | McDaniel et al. | 585/853 |
| 5,264,114 | * | 11/1993 | Dunbar | 208/48 AA |
| 5,340,382 | | 8/1994 | Beard | 95/151 |
| 5,364,604 | * | 11/1994 | Spink et al. | 423/210 |
| 5,614,087 | | 3/1997 | Le | 210/180 |
| 5,885,422 | * | 3/1999 | Kurukchi et al. | 203/45 |

OTHER PUBLICATIONS

Koch Engineering Company, Inc., "Static Mixing Technology —Bulletin KSM–6," 1997, 16 pp., Wichita, Kansas.

* cited by examiner

Primary Examiner—Walter D. Griffin
(74) Attorney, Agent, or Firm—Akin, Gump, Strauss, Hauer & Feld, L.L.P.

(57) ABSTRACT

An inline, high-shear mixer is provided in a cracked gas stream upstream of a caustic tower in an ethylene production unit. Spent caustic is withdrawn from the bottom of the caustic tower and pumped to the mixer, where the spent caustic mixes with and absorbs acid gas components from the cracked gas stream. The spent caustic is separated from the cracked gas, forming a partially treated cracked gas stream. The partially treated cracked gas stream is then fed to the caustic tower. Polymer deposition in the caustic tower is reduced because polymeric material is formed when the cracked gas stream is mixed with the spent caustic and is removed before the cracked gas stream is fed to the caustic tower.

14 Claims, 2 Drawing Sheets

PROCESS FOR PRETREATING CRACKED GAS BEFORE CAUSTIC TOWER TREATMENT IN EHTYLENE PLANTS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention relates to a process for removal of undesirable components from a hydrocarbon gas stream and in particular to removal of acid gas components and polymer precursors from cracked gas in an ethylene plant upstream of a caustic tower.

2. Description of the Related Art

In the petroleum and petrochemical industries it is common to remove acid gas components, such as carbon dioxide ($CO_2$) and hydrogen sulfide ($H_2S$), from hydrocarbon gas streams by intimate contact with an aqueous solution of a base such as sodium hydroxide (NaOH), which is a caustic solution. By reaction with the caustic of the caustic solution, i.e. NaOH, acid gas components such as hydrogen sulfide and carbon dioxide are converted into sodium sulfide ($Na_2S$), sodium hydrosulfide (NaHS), sodium carbonate ($Na_2CO_3$) and sodium bicarbonate ($NaHCO_3$) which are absorbed into the caustic solution and, thus, removed from the hydrocarbon gas stream.

One type of petrochemical operation wherein an aqueous sodium hydroxide solution is almost invariably used for gas scrubbing is in an ethylene production unit or plant. In an ethylene plant a saturated aliphatic hydrocarbon feed, such as ethane, propane, or higher molecular weight hydrocarbon mixtures such as naphtha, atmospheric and/or vacuum gas oils, and the like, is heated at high temperatures in the presence of steam to crack the saturated hydrocarbon molecules down to lower molecular weight unsaturated hydrocarbons such as ethylene predominately, followed by propylene, and then various quantities of $C_4$, $C_5$ and $C_6$ mono- and diolefinic hydrocarbons, with a lesser quantity of $C_7$ and higher weight saturated and unsaturated aliphatic, alicyclic and aromatic hydrocarbon.

During steam cracking any sulfur containing compounds added and/or present in the hydrocarbon feed stream are converted into hydrogen sulfide and/or organically bound sulfur compounds, and also, a content of carbon dioxide is generated by a water-gas shift reaction. The resultant gas mixture from steam cracking is then quenched from a temperature of about 700–1100° to a lower temperature of about 35 to 40° C. whereupon the major portion of its water and $C_{7+}$ hydrocarbon content is condensed and separated from the gas mixture. After quenching, the remaining constituents of the gas mixture are conditioned by various steps of gas compression and refrigerative cooling to prepare it for cryogenic distillation whereby its ethylene, propylene and butenes contents will ultimately be recovered in essentially pure form for ultimate use as monomers in the production of various polymers, such as polyethylene, ethylene copolymers, polypropylene and the like.

One step required to properly condition the gas mixture prior to its cryogenic distillation is to scrub the cracked gas essentially free of any acid gas components, such as hydrogen sulfide and carbon dioxide. This is accomplished at some interstage location of a multi-stage gas compression system and, on occasion post-compression, wherein the cracked gas stream is at a pressure of from about 10 to about 20 atmospheres (atm) by contacting the compressed gas stream with an aqueous sodium hydroxide solution by countercurrent contact in a gas-liquid contact vessel often referred to as an "absorber," "scrubber" or "caustic tower." After such gas scrubbing contact the aqueous sodium hydroxide solution which is discharged from the bottom of this tower contains, in addition to some unreacted sodium hydroxide, the sodium sulfide, sodium hydrosulfide, sodium carbonate and sodium bicarbonate that results from the removal of acid gas compounds from the so scrubbed gas stream. To prevent a build-up of the concentration of these components in the caustic tower and to provide for hydraulic room to add a quantity of fresh higher strength caustic solution to the caustic tower to make up for the consumption of caustic therein, a quantity of this weak or "tower spent" caustic solution is bled away from being recirculated back to the tower. However, to maintain a proper liquid volume of caustic solution circulation within the tower, a portion of this weak or "tower spent" caustic solution is recirculated back to the tower. That quantity of the weak or "tower spent" caustic solution bled away from the tower has been referred to in this art as "spent caustic." Such tower spent caustic has to be conditioned by further processing steps in a spent caustic treatment unit to condition it for an environmental sound disposal.

The caustic tower can be an important factor in determining the production capacity of an ethylene production unit because it is necessary to remove acid gas components so that the scrubbed hydrocarbon gas has a minimal, acceptable level of these components. Further, since all of the cracked gas must pass through the caustic tower, if the caustic tower reaches its capacity limit, then the caustic tower can establish an equipment limit for ethylene production. Thus, the capacity of the caustic tower can be an important factor in determining the capacity of the ethylene production unit, regardless whether the ethylene production unit is being designed for grassroots construction or is an already existing facility.

The capacity of a caustic tower can be, and frequently is, adversely affected by polymer formation. The cracked gas contains highly reactive carbonyls and diolefins, which can form polymers, and thus are of concern throughout the plant, but particularly in the caustic tower. The highly reactive carbonyls and diolefins, and possibly other compounds, react or polymerize to form polymers which coat, foul and plug the internals of equipment, such as the caustic tower, which reduces the equipment's efficiency and capacity and, at times, necessitates a shutdown of the equipment for cleaning. Polymer formation in the caustic tower thus reduces its capacity both by reducing its operating efficiency and by necessitating the shutdown of the caustic tower for cleaning and removing deposits of polymeric material.

In summary, an ethylene plant is financially and economically very important, and it is typically advantageous to maximize its production rate. However, the caustic tower in the ethylene plant can limit the production rate. Such a limitation is very costly, and the limitation can be due to the capacity of the caustic tower to remove acid gas components from the cracked gas. The capacity of the caustic tower is at least limited by its mechanical and process design, but the capacity can be further limited by deposits of polymeric material in the caustic tower.

SUMMARY OF THE INVENTION

The present invention provides a process for removing a quantity of the acid gas components and polymer precursors from the cracked gas stream upstream of the caustic tower, which effectively increases the efficiency and capacity of the caustic tower. Prior to admission of the cracked gas to the caustic tower, a caustic solution is mixed with the cracked gas in a high-shear mixer, such as an inline, cocurrent-flow static mixer or a venturi scrubber. Acid gas components are absorbed into the caustic solution, thereby reducing the concentration of the acid gas components in the cracked gas stream before its admission to the caustic tower. Polymer precursors are also removed, reacting in the presence of the caustic and forming polymeric material, which is removed from the cracked gas stream in a knock-out drum upstream of the caustic tower.

Thus, a cleaner cracked gas stream is formed and fed to the caustic tower, reducing both the inlet concentration of acid gas components and reactive polymer precursors and thus reducing deposits of polymeric material in the caustic tower. A lower inlet concentration of acid gas components allows the caustic tower to operate at higher throughput rates at a constant concentration of acid gas components in the fully treated overhead cracked gas stream. Alternatively, a lower inlet concentration of acid gas components allows the caustic tower to operate at a constant throughput, but with a lower concentration of acid gas components in the final overhead gas product from the caustic tower. In addition, polymer deposition and fouling in the caustic tower is reduced, which increases utilization of the caustic tower since cleaner tray decks and tower internal surfaces maximize tower efficiency of acid gas removal and caustic utilization.

In a preferred embodiment, tower spent caustic solution is withdrawn from the spent caustic outlet line from the caustic tower and combine with a quantity of weakened caustic solution discharged from a knock-out drum located upstream of the caustic tower and this mixture of weakened-tower spent caustic is fed to the inlet of a pump. The discharge of the pump is fed to the high-shear mixer where the mixture of weakened-tower spent caustic solution comes into intimate contact with the cracked gas, absorbing a portion of the acid gas components into the mixture of weakened-tower spent caustic solution and reacting polymer precursors into separatable prepolymers and polymers. The mixture emanating from the static mixer, which is a gas-liquid mixture, is then separated in a knock-out drum having a sufficient size and internal components to allow disengagement between the gas and liquid. The residual gas components of this so-pretreated cracked gas passes overhead from the knock-out drum to the caustic tower, while the liquid which is herein referred to as "weakened" caustic is fed in whole or part back to the static mixture and at times in part to a spent caustic treatment system.

BRIEF DESCRIPTION OF THE DRAWINGS

A better understanding of the present invention can be obtained when the following detailed description is considered in conjunction with the following figures.

DETAILED DESCRIPTION OF INVENTION

Figure 1:
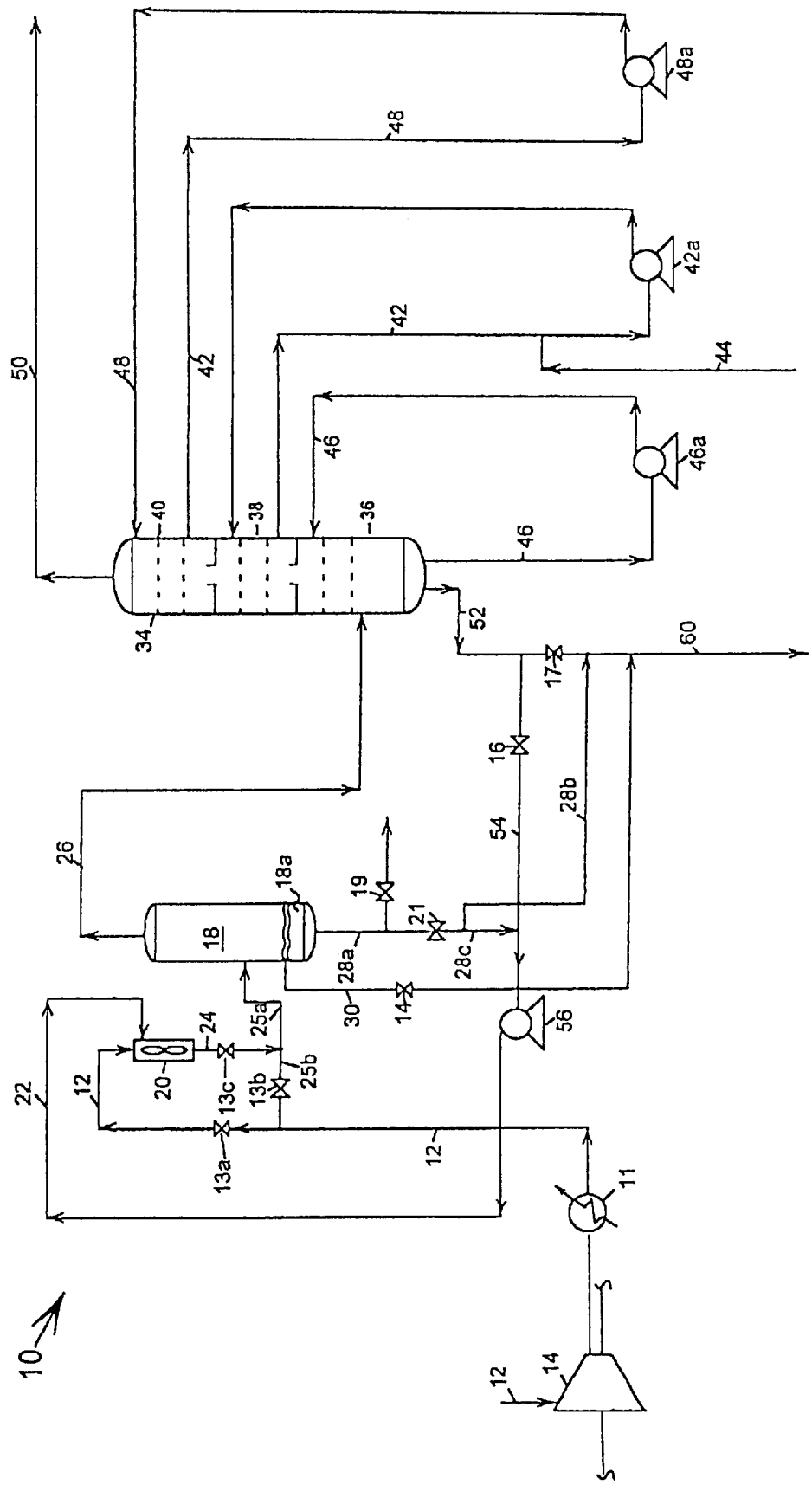
FIG. 1 is a schematic illustration of a process for pretreating a cracked gas stream in an ethylene plant according to the present invention.

With reference to FIG. 1, the present invention provides a process 10 for pretreating a cracked gas stream 12 in an ethylene plant. Cracked gas stream 12 is pressurized in a compressor 14 and cooled in an aftercooler 11 prior to acid gas removal in a caustic tower 34. A knock-out drum 18 is essentially a conventional knock-out drum for separating condensate liquid in cracked gas stream 12 from the vapor and is positioned in the flow stream in a position upstream from that of the caustic tower.

An inline static mixer 20 is provided in the cracked gas line between aftercooler 11 and knock-out drum 18. A caustic stream 22 is injected into static mixer 20 for intimate mixing and contact with cracked gas stream 12, forming a gas-liquid mixture 24 that is fed to knock-out drum 18 through a line 25a. A line 25b provides a bypass for cracked gas stream 12 around mixer 20, but a valve 13a and 13c are normally open while a valve 13b is normally closed so that cracked gas normally flows through mixer 20. In the design illustrated by FIG. 1 a number of valves are provided which enables the unit operator to isolate and disable the cracked gas pretreatment unit of this invention and to thereby operate the ethylene production unit in a conventional mode; these valves being 13a, 13b, 13c, 14, 16, 17, 19 and 21. To operate in a mode to practice this invention valves 13a, 13c, 16 and 21 are open to flow whereas 13b, 17 and 19 are closed and valve 14 is periodically opened to bleed out of knock-out drum 18 a portion of its accumulated weakened caustic solution together with the floating layer of accumulated polymer through line 30. To isolate the cracked gas pretreater elements of this invention so as to operate the ethylene production unit in a conventional mode valves 13a, 13c, 16 and 21 are closed, valves 13b, 17 and 19 are open and condensate liquid is discharged through valve 19 to a condensate treatment unit while weak or tower spent caustic solution bleed off is discharged through valve 17 to line 60 for routing to a spent caustic treatment unit.

Caustic stream 22 during passage through static mixer 20 absorbs acid gas components such as $H_2S$ and $CO_2$ and also removes carbonyls and dienes from cracked gas stream 12, which reduces the concentration of these acid gas components and polymer precursors in the cracked gas and provides a cleaner cracked gas stream. Knock-out drum 18 allows separation of gas-liquid mixture 24 into a gas and a liquid stream, forming a pretreated cracked gas stream 26 which comprises the residual gaseous components of cracked gas 12 and a liquid stream 28a, respectively. This liquid stream 28a is hereafter referred to as a "weakened" caustic solution or an exhausted spent caustic solution.

Pretreated cracked gas stream 26 is cleaner than cracked gas stream 12, but is considered partially treated because only a portion of the acid gas components $CO_2$ and $H_2S$ and polymer precursors carbonyls and dienes are removed. This weakened or exhausted spent caustic 18a accumulation in knock-out drum 18 is transferred out of drum 18 by line 28a and divided into stream 28b and stream 28c. Stream 28c is combined with the weak or tower spent caustic bleed stream 52 in line 54 to form that caustic stream 22 which is injected by pump 50 into static mixer 20. The remainder of the weakened caustic stream 28b from knock-out drum 18 as exhausted spent caustic stream is typically fed to a spent caustic treatment unit (not shown) for treatment prior to disposal, typically as a waste stream, but in some cases the stream has commercial value, such as for the Kraft process used in the pulp and paper industry.

In addition to removing acid gas components, the mixing of caustic stream 22 with cracked gas stream 12 causes polymer-forming precursors, such as highly reactive carbonyls and diolefins, to react and form a polymer precipitate. This is beneficial because otherwise the polymer would be formed in downstream caustic tower 34 and its associated equipment, as discussed below, where its formation and deposition on operating surfaces is detrimental to the operation of the caustic tower and therefore the overall operation of the ethylene production unit. Polymeric materials, which are formed when caustic stream 22 mixes with cracked gas stream 12, are removed from the cracked gas in knock-out drum 18 and incorporated in liquid 18a. Thus, pretreated cracked gas stream 26 has lower concentrations of acid gas components and polymer-forming precursors relative to cracked gas stream 12. Since the polymeric materials float upon the liquid surface of the weakened caustic solution in knock-out drum 18, this polymeric material may be continuously or periodically removed from the drum by line 30 by operation of valve 14 and the polymeric material and a portion of weakened caustic so bled out of the drum may be added to stream 60 which routes to a spent caustic treatment unit.

Partially treated cracked gas stream 26 is fed to a caustic tower 34 for further treatment to remove essentially all of the remaining acid gas components. Caustic tower 34 has a bottom section 36, which receives partially treated cracked gas stream 26, a middle section 38 and a top section 40. A strong caustic solution circuit 42, which receives an addition of fresh make-up caustic 44 as required for the removal of acid gases from stream 12 to the required levels in treated stream 50, is circulated by a pump 42a to middle section 38. A weak or tower spent caustic solution circuit 46 is circulated by a pump 46a in bottom section 36. Partially treated cracked gas stream 26 first contacts the weak or tower spent caustic in bottom section 36, where partially treated cracked gas stream 26 has initially its highest concentration of acid gas components so that utilization of residual caustic strength of this weak or tower spent caustic solution is maximized.

The cracked gas rises through the tower and next contacts strong caustic in middle section 38, where the strong caustic solution minimizes the concentration of acid gas components in the cracked gas. The cracked gas rises into top section 40, where a wash water circuit 48 is provided for contacting and removing caustic from the cracked gas in the tower. A pump 48a circulates wash water through top section 40, where caustic is removed from the cracked gas, forming a fully treated cracked gas stream 50 as an overhead stream. Thus, caustic tower 34 provides for removal of acid gas components from partially treated cracked gas stream 26 to a desired level, which is typically to less than 1 vppm $CO_2$ and less than 0.1 vppm $H_2S$ (vppm meaning volume part per million). Because caustic stream 22 is mixed with cracked gas stream 12 by mixer 20, a portion of the acid gas components in cracked gas stream 12 have been removed before the cracked gas is fed to the caustic tower. Consequently, caustic requirements for neutralization of these acid gas components in the caustic tower is reduced, which effectively increases the capability of the caustic tower for either acid gas removal or the enhancement of caustic utilization in the tower as discussed further below.

Caustic tower 34 is an absorber for mixing liquid caustic with gaseous components comprising the cracked gas, where the caustic absorbs and neutralizes the acid gas components in the cracked gas. Gas components flow overhead as fully treated cracked gas stream 50, and a liquid stream is withdrawn from bottom section 36 of caustic tower 34 as a weak or tower spent caustic bleed-off stream 52 and in part as a stream 46 for recycle back to the tower. Thus, caustic tower 34 is essentially a conventional caustic tower in an ethylene plant, except according to the present invention, the concentrations of acid gas components and polymer precursors in the cracked gas fed to the caustic tower are lower than that of a conventional process.

Prior to the introduction of the present invention, polymer formation in the caustic tower was a problem. Polymer precursors in the cracked gas, which are believed to be primarily highly reactive carbonyls and diolefins, reacted upon caustic contact within the tower to form polymers that deposited in the caustic tower, fouling the internals, which required shutdowns of the caustic tower for cleaning. In some cases the tower bottom section could be isolated and cracked gas could be fed directly to the middle section so that the middle and top sections could remain in operation while the bottom section was out of service for cleaning. In either case polymer formation in the caustic tower was a problem because it reduced the capacity and efficiency of the caustic tower, which all too often limited the production capacity of the ethylene plant.

The caustic stream 22 feed to static mixer 20 via pump 56 comprises a quantity of weak or tower spent caustic supplied to line 54 by line 52 and a quantity of weakened or exhausted spent caustic taken to line 54 by line 28c. The quantity of weak or tower spent caustic 52 is essentially limited by the requirements of such caustic solution that must continuously be bled off tower 34 to maintain a proper level of liquid in the sump of caustic tower 34. The remainder of the total liquid volume requirement for caustic stream 22 to provide for the proper or desired operation of static mixer 20 for throughput of this same volume of gas is provided by line 28c from the weakened or exhausted spent caustic 28a discharged from knock-out drum 18.

Typically, it is desired to operate the static mixer 20 under conditions so as to achieve at least one additional theoretical stage of liquid-gas mixing for absorption of acid gases, which is equal to from about 3 to about 5 actual tower trays. This in turn typically requires a liquid volume to gas volume ratio of from about 1/50 to about 1/1000. Accordingly, the knock-out drum 18 has to be sized sufficiently to provide for an accumulation 18a of liquid caustic solution in its bottom section which is capable of supplying the requisite quantity of weakened or exhausted caustic 28c for the proper or desired operation of the particular static mixer structure 20 selected for association to its operation. The discharge from pump 56 is fed to inline static mixer 20 as caustic stream 22, which brings the description of process 10 full circle. The flow rate of caustic stream 22 is determined by proportioning it to the flow rate of cracked gas stream 12. Adjustments are made for the concentration of acid gas components in cracked gas stream 12, where a higher concentration calls for a higher caustic flow rate. Further, adjustments are made for the residual strength of the caustic in the caustic stream 22, where a higher residual strength calls for a lower quantity of the weak or tower spent caustic 52.

A static mixer is made up of a series of stationary elements placed lengthwise in a section of a pipe; each element consisting of corrugated plates touching each other to form open intersecting channels. The fluids to be contacted enter the unit and are split into individual streams in the channels. At each channel intersection, a part of the fluid shears off into the crossing channel. Adjacent mixing elements are positioned 90° relative to each other so two dimensional mixing takes place over the first element and three dimensional mixing over all successive elements.

In a two phase gas-liquid flow system there are several possible flow regimes. These are bubble, wavy, slug, annular and dispersed (also referred to as spray or misty) flows. In general it is desired to operate in the dispersed flow regime by spraying the small volume of absorbing liquid into small droplets (mist) in the large volume of the continuous gas phase. The liquid phase velocity ranges from 0–2 ft/s and the gas velocity ranges from 10–80 ft/s, or vapor/liquid volumetric ratio ranges from 50 to 1000.

The mixer-settler can be installed either vertically or horizontally. Vertical down flow generally provides optimum performance because the pressure drop is lower and phase separation is minimized at low flow rates.

The efficiency of static mixers depend on the hydraulic diameter (crimp height of the corrugated plate). The hydraulic diameter can be varied within a given pipe cross section in order to optimize the amount of surface area present. Small hydraulic diameter per mixing element means a large wetted surface area for the mixer as a whole and therefore high mass transfer rates.

The static mixer is a cocurrent contactor and therefore can achieve a maximum of one theoretical stage. When the absorption is accompanied by fast liquid phase chemical reaction, the transfer of the solute from the gas phase to the liquid phase is the controlling step and for such process the static mixer length is calculated by:

$$Z = \ln(y_a/y_o) \times V_G/K_G a$$
$$Z = N_{OG} \times H_{OG}$$

| | |
|---|---|
| $y_a, y_o$ | inlet and outlet gas phase solute concentration |
| $V_G$ | volumetric gas flow rate |
| $K_G$ | overall gas phase mass transfer coefficient |
| a | specific surface area of static mixer internal |
| $N_{OG}$ | overall gas phase number of transfer units |
| $H_{OG}$ | overall gas phase height of transfer units |

Installing a cocurrent static mixer upstream of the tower improves the overall efficiency of the absorption by up to one theoretical stage which is equivalent to 3–5 actual trays in the caustic tower.

When the design flow rates for cracked gas stream 12 and caustic stream 22 have been determined, the size of inline static mixer 20 can be determined. Typically, a manufacturer of static mixers, such as Koch Engineering Company, Inc. of Wichita, Kans., sizes a static mixer for its customer. The customer provides minimum, normal and maximum flow rates, viscosity, density, temperature, pressure, maximum allowable pressure drop across the mixer, and the flow direction (horizontal, upward, or downward) in which the static mixer will be used. Mechanical design aspects, such as design pressure and design temperature, as well as an appropriate material of construction, are incorporated in the final design of an appropriate static mixer for a particular application.

Figure 2:
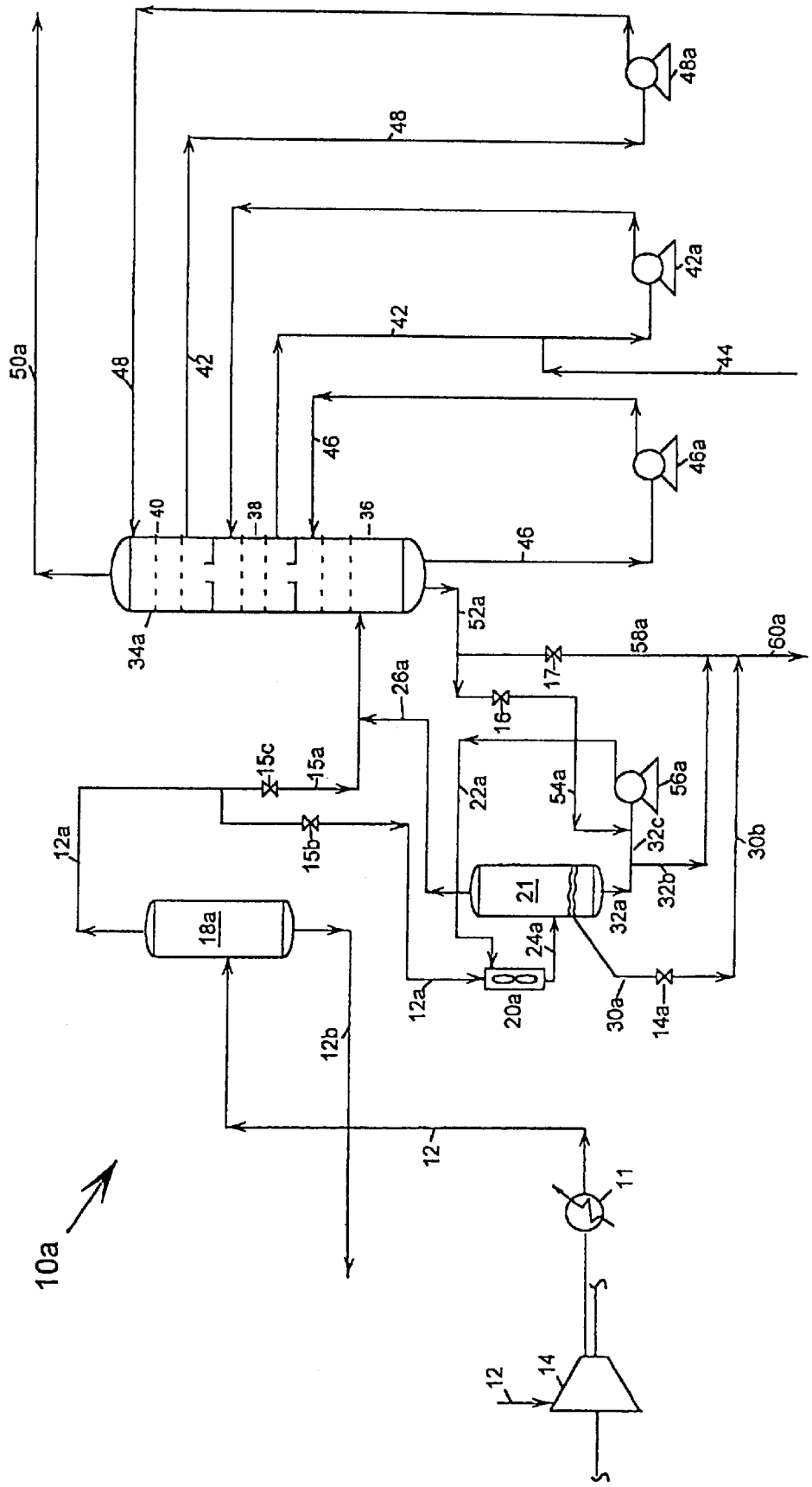
FIG. 2 is a schematic illustration of a process for pretreating a cracked gas stream in an ethylene plant according to an alternative embodiment of the present invention.

Turning now to FIG. 2, in an alternative embodiment, the present invention provides a process 10a for pretreating cracked gas stream 12. Liquid components in cracked gas steam 12 are separated and removed by a knock-out drum 18a, forming a cracked gas stream 12a and a condensate liquid stream 12b. Cracked gas stream 12a is routed through an inline static mixer 20a. A caustic stream 22a is injected into static mixer 20a for intimate mixing and contact with the cracked gas stream 12a. The gaseous cracked gas is thoroughly mixed with the liquid caustic, and a gas-liquid mixture 24a is formed by static mixer 20a. Acid gas components in the cracked gas are neutralized, and polymer precursors are reacted to prevent detrimental polymer deposits in the downstream caustic tower and its associated equipment. Gas-liquid mixture 24a is fed to a knock-out drum 21, which allows separation of the residual gaseous component to cracked gas stream into a vapor to leave as a liquid phase the liquid components, forming a partially pretreated cracked gas stream 26a and an exhausted spent caustic stream 32a, respectively. A line 15a provides a bypass for cracked gas stream 12a around mixer 20a and knock-out drum 21, but a valve 15b in cracked gas stream 12a is normally open while a valve 15c is normally closed so that cracked gas normally flows through mixer 20a and knock-out drum 21.

Partially treated cracked gas stream 26a, which is cleaner than cracked gas stream 12a, is fed to a caustic tower 34a. Caustic tower 34a is operated in the same manner as described above for caustic tower 34 of FIG. 1, and the benefits of acid neutralization and polymer formation external and upstream of caustic tower 34a, due to the mixing provided by mixer 20a, are similarly realized. Likewise, a fully treated cracked gas stream 50a is produced, and a weak or tower spent caustic stream bleed stream 52a is generated from caustic tower 34a. Exhausted spent caustic stream 32a from knock-out drum 21 is split, and a first portion 32b is routed to a spent caustic treatment unit. A second portion 32c of exhausted caustic stream 32a is combined with tower spent caustic 52a which is routed by line 54a and fed to pump 56a. The discharge from pump 56a is caustic stream 22a, which is a mixture of weakened or exhausted caustic from knock-out drum 21 and weak or tower spent caustic 52a taken from tower 34a, which is fed to inline static mixer 20a bringing the description of this alternative embodiment of the present invention full circle. Valve 14a is periodically opened to bleed out of knock-out drum 21 a portion its weakened caustic solution together with that floating layer of accumulated polymer through line 30a.

With either embodiment a waste product, weak or tower spent caustic stream 52 or 52a, which is at its lowest caustic residual strength is used to reduce the content of acid gas components and polymer precursors in the cracked gas stream that is fed to the caustic tower. Caustic utilization is increased because the static mixer provides at least one additional theoretical stage of liquid-gas mixing for absorption of acid gas components into the otherwise depleted caustic solution or the equivalent of 3 to about 5 actual trays of a caustic tower. The caustic content of the solution is thus more fully utilized as its residual strength is consumed by neutralizing hydrogen sulfide to sodium sulfide and by neutralizing carbon dioxide to sodium carbonate.

Reacting tower spent caustic with cracked gas via inline static mixer 20 or 20a and neutralizing a portion of the acid gas components yields a feed stream to the caustic tower that has a lower concentration of acid gas components. The use of the inline static mixer thus results in a cleaner feed for the caustic tower. For an existing caustic tower, its capacity to remove $H_2S$ and $CO_2$ remains unchanged with the addition of the static mixer, yet the feed to the caustic tower has a lower concentration of acid gas components $H_2S$ and $CO_2$. As a result a treated cracked gas can be produced that has a lower concentration of acid gas constituents than would be possible without the inline static mixer. Alternatively, a treated gas can be produced that has the same quantity of acid gas constituents but the quantity of cracked gas that can be effectively treated is increased. In either case the capacity to remove acid gas components, such as $H_2S$ and $CO_2$, from cracked gas is increased because the inline mixing of tower spent caustic with the cracked gas provides additional capacity.

In addition, a portion of the reactive components, meaning polymer-forming constituents, in the cracked gas stream that would otherwise foul the caustic tower are reacted as a result of the mixing and contact with caustic 22 or 22a provided by static mixer 20 or 20a. Polymer-forming constituents in the cracked gas are reacted upstream of the caustic tower. As a result of the mixing with weakened-tower spent caustic 22 or 22a in the inline static mixer, polymeric material can be actually formed and removed from the cracked gas before the cracked gas is fed to the caustic tower.

Consequently, fouling is reduced in the caustic tower since the amount of polymer-forming precursors in the feed to the caustic tower has been reduced according to the present invention. A significant portion of polymer formation occurs external to the caustic tower, and the polymer precursors in the cracked gas are separated and removed from the feed to caustic tower. The problem of polymer formation is not merely transferred from one key piece of equipment to another. With reference to FIG. 1, the so formed polymer flows off and out with hydrocarbon stream 30. With reference to FIG. 2, the polymer flows directly to the spent caustic treatment unit via discharge stream 30b, which again keeps it out of the caustic tower where the effects of polymer deposition are most detrimental. With a lower concentration of polymer-forming constituents in the cracked gas fed to the caustic tower, the amount of time that the caustic tower is down for cleaning to remove polymer deposits is reduced. This allows increased utilization of the caustic tower, which over the long run increases the capacity of the caustic tower.

EXAMPLE

Simulation runs using computer modeling provide an estimate of the benefits and advantages of incorporating a high-shear contractor for mixing a weak or weakened caustic with the cracked gas stream upstream of the caustic tower. Table 1 provides a base case of typical operating data for cracked gas feed to a caustic tower, fresh caustic input to the caustic tower, treated gas from the caustic tower, and spent caustic from the caustic tower for a typical ethylene plant operated at a 90% utilization of fresh caustic input prior to installation of a high-shear contractor.

TABLE 1

| Stream | Flow rate lb/hr | Flow rate ft3/hr Note-3 | $H_2S$ Concentration vppm | $CO_2$ Concentration vppm | Polymer Precursors Concentration vppm | NaOH Strength wt % | NaOH lb/hr |
|---|---|---|---|---|---|---|---|
| Cracked Gas 12 | 723,000 | 671,309 | 60 | 240 | 400 | NA | NA |
| Make-up Caustic 44 to Caustic Tower 34 | 7,873 | 115.78 | NA | NA | NA | 10 | 787.3 |
| Tower Spent Caustic 52 | 8,761 | 128.8 | NA | NA | Note-2 | 0.90 | 79.2 |
| Weakened Caustic 28a (or 32a) from Knock-out drum 18 (or 21) | NA | NA | NA | NA | NA | NA | NA |
| Caustic Stream 28c | NA | NA | NA | NA | NA | NA | NA |
| Caustic Stream 22 (or 22a) | NA | NA | NA | NA | NA | NA | NA |

TABLE 1-continued

| Stream | Flow rate lb/hr | Flow rate ft3/hr Note-3 | $H_2S$ Concentration vppm | $CO_2$ Concentration vppm | Polymer Precursors Concentration vppm | NaOH Strength wt % | NaOH lb/hr |
|---|---|---|---|---|---|---|---|
| Pretreated Gas 26 | NA | NA | NA | NA | NA | NA | NA |
| Final Treated Gas 50 (or 50a) | 722,112 | 670,485 | 0.01 | 1.0 | 100 | NA | NA |
| Exhausted Caustic 60 | NA | NA | NA | NA | NA | NA | NA |

Note-1 Caustic recirculation in the tower's caustic sections is 5–10 times the fresh caustic rate.
Note-2 Polymer precursors removed from gas phase, dissolve and polymerize in the spent caustic.
Note-3 Actual gas volumetric flow rate at operating pressure and temperature.

From Table 1, illustrating a conventional operation of a caustic tower, polymer precursors in the untreated gas is at 400 vppm and the treated gas has 100 vppm. This means 300 vppm (≈515 lb/hr) of precursors reacted to form polymers in the caustic tower.

For comparison to the base case, Table 2 provides operating data for the same ethylene plant, but with a high-shear inline static mixer installed upstream of the caustic tower according to the present invention, where spent caustic stream 22 is mixed with cracked gas stream 12 and utilization of fresh input caustic is maintained at 90%.

gas feed to the caustic tower is reduced from 60 vppm and 240 vppm to 20 vppm and 168 vppm, respectfully. Treated gas 50 has a lower concentration of acid gas components, the $H_2S$ and $CO_2$ having been reduced to 0.001 vppm and 0.2 vppm, respectively. Thus, a lower concentration of acid gas components can be achieved in the fully treated cracked gas stream in the overhead of the caustic tower.

Alternatively, as shown in Table 3, the concentration of acid gas components in the fully treated cracked gas stream can remain constant, while instead fresh caustic utilization is increased from 90% to 99.9%. Polymer precursors are

TABLE 2

| Stream | Flow rate lb/br | Flow rate ft3/hr (Note-4) | $H_2S$ Concentration vppm | $CO_2$ Concentration vppm | Polymer Precursors Concentration vppm | NaOH Strength wt % | NaOH lb/hr |
|---|---|---|---|---|---|---|---|
| Cracked Gas 12 | 723,000 | 671,309 | 60 | 240 | 400 | NA | NA |
| Make-up Caustic 44 to Caustic Tower 34 | 7,894 | 116.1 | NA | NA | NA | 10 | 789.4 |
| Tower Spent Caustic 52 | 8,305 | 122.1 | NA | NA | Note-2 | 4.14 | 348.7 |
| Weakened Caustic 28a (or 32a) from Knock-out drum 18 (or 21) | 100,564 | 1,478.9 | NA | NA | Note-2 | 0.89 | 895.1 |
| Caustic Stream 28c | 91,695 | 1,348.5 | NA | NA | NA | 0.89 | 816.2 |
| Caustic Stream 22 (or 22a) | 100,000 | 1470.6 | NA | NA | Note-2 | 1.16 | 1,159.9 |
| Pretreated Gas 26 | 722,436 | 670,786 | 20 | 168 | 150 | NA | NA |
| Final Treated Gas 50 (or 50a) | 722,025 | 670,404 | 0.001 | 0.2 | 50 | NA | NA |
| Exhausted Caustic 60 | 8,869 | 130.4 | NA | NA | Note-2 | 0.89 | 78.9 |

Note-1 Caustic recirculation in the tower's caustic sections is 5–10 times the fresh caustic rate.
Note-2 Polymer precursors removed from gas phase, dissolve and polymerize in the spent caustic.
Note-3 Volumetric Vapor/Liquid ratio through static mixer is 456:1
Note-4 Actual gas volumetric flow rate at operating pressure and temperature As can be seen in the data, by incorporating mixer 20 in the process and mixing caustic stream 22 with cracked gas stream 12, the concentration of $H_2S$ and $CO_2$ in the cracked gas feed to the caustic tower is reduced from 60 vppm and likewise reduced from 400 vppm in cracked gas stream 12 to 150 vppm in partially treated cracked gas 26, which is feed for the caustic tower.

TABLE 3

| Stream | Flow rate lb/hr | Flow rate ft3/hr (Note-4) | $H_2S$ Concentration vppm | $CO_2$ Concentration vppm | Polymer Precursors Concentration vppm | NaOH Strength wt % | NaOH lb/hr |
|---|---|---|---|---|---|---|---|
| Cracked Gas 12 | 723,000 | 671,309 | 60 | 240 | 400 | NA | NA |
| Make-up Caustic 44 to Caustic Tower 34 | 7,103 | 104.5 | NA | NA | NA | 10 | 710.3 |
| Tower Spent Caustic 52 | 7,608 | 111.9 | NA | NA | Note-2 | 1.05 | 79.7 |
| Weakened Caustic 28a | 100,469 | 1,477.5 | NA | NA | Note-2 | 0.01 | 8.8 |

TABLE 3-continued

| Stream | Flow rate lb/hr | Flow rate ft3/hr (Note-4) | H₂S Concentration vppm | CO₂ Concentration vppm | Polymer Precursors Concentration vppm | NaOH Strength wt % | NaOH lb/hr |
|---|---|---|---|---|---|---|---|
| (or 32a) from Knock-out drum 18 (or 21) | | | | | | | |
| Caustic Stream 228c | 92,392 | 1,358.7 | NA | NA | NA | 0.01 | 8.1 |
| Caustic Stream 22 (or 22a) | 100,000 | 1,470.6 | NA | NA | Note-2 | 0.09 | 87.9 |
| Pretreated Gas 26 | 722,531 | 670,874 | 43 | 223 | 150 | NA | NA |
| Final Treated Gas 50 (or 50a) | 722,026 | 670,405 | 0.01 | 1.0 | 50 | NA | NA |
| Exhausted Caustic 60 | 8,077 | 118.8 | NA | NA | Note-2 | 0.01 | 0.7 |

Note-1 Caustic recirculation in the tower's caustic sections is 5–10 times the fresh caustic rate.
Note-2 Polymer precursors removed from gas phase, dissolve and polymerize in the spent caustic.
Note-3 Volumetric Vapor/Liquid ratio through static mixer is 456:1
Note-4 Actual gas volumetric flow rate at operating pressure and temperature In Tables 2 and 3 invention operation, polymer precursors in the gas entering the caustic tower is at 150 vppm and the treated gas has 50 vppm. This means 100 vppm (172 lb/hr) of precursors reacted to form polymers in the caustic tower. Therefore, the invention reduces the rate of polymer formation in the tower to about ⅓ of that in the conventional design of Table 1, so that a prolonged tower service before shut down for cleaning by at least three times as long can be realized. This results in a higher online time for the caustic tower, which ultimately increases its production capacity.

Also, Table 2 shows that the addition of the static mixer reduces the concentration of the CO₂ in the treated gas from 1 vppm down to 0.2 vppm i.e. by a factor of 5 at the same overall 90% caustic utilization.

Thus, the incorporation of a mixer and the mixing of tower spent caustic with cracked gas upstream of the caustic tower improves the operation of an ethylene plant, whether the plant is new or on existing one that is retrofitted to practice this invention. Acid gas components, including H₂S and CO₂, are reduced in the feed to the caustic tower, which allows the caustic tower to yield a treated cracked gas stream having a lower concentration of these components or to operate at a higher throughput at the same concentration level, depending on plant requirements. The present invention thus provides greater capacity for removing acid gas components from cracked gas.

In addition, the present invention removes polymer precursors from the cracked gas feed to the caustic tower. Without the present invention, polymer formation and deposition in the caustic tower is a problem because it fouls the tower internals, reducing both tower efficiency and throughput. With the present invention, on the other hand, much of the polymer formation occurs upstream and external to the caustic tower. Consequently, with the present invention the problem of polymer formation in the caustic tower is largely solved. The downtime of the caustic tower for removal of polymer deposits is greatly reduced with the present invention. Reduced downtime translates to higher utilization of the caustic tower, which ultimately provides greater ethylene plant capacity in those cases where the caustic tower is a capacity limitation for the ethylene plant.

The present invention is thus particularly useful as a debottlenecking project for an existing ethylene plant having its capacity limited by its caustic tower. By installing an inline static mixer, a venturi scrubber or similar equipment suitable for mixing liquid caustic with gaseous cracked gas, the capacity for removing both acid gas components and polymer precursors is increased. For a new plant, the present invention is valuable because it provides a lower cost alternative for removal of acid gas components than that of increasing the size of the caustic tower, while simultaneously providing the benefit of polymer formation and removal upstream of and external to the caustic tower.

The foregoing disclosure and description of the invention are illustrative and explanatory thereof, and various changes in the details of the illustrated apparatus and construction and method of operation may be made without departing from the spirit of the invention.

What is claimed is:

1. A process for pretreating a cracked gas stream containing acid gas components, comprising:
    (a) feeding the cracked gas stream to a mixer;
    (b) mixing a caustic stream with the cracked gas stream in the mixer to form a liquid-gas mixture;
    (c) separating the liquid-gas mixture to form a more fully spent caustic stream and a pretreated cracked gas stream; and
    (d) feeding the pretreated cracked gas stream to a caustic tower.

2. The process of claim 1, wherein the mixer is a concurrent flow mass transfer device.

3. The process of claim 1, wherein the mixer is a static mixer.

4. The process of claim 1, wherein the mixer is a venturi scrubber.

5. The process of claim 1, wherein the separation step is performed in a vessel that is also used as a knock-out drum downstream of a compressor for removing liquid hydrocarbon components from the cracked gas stream.

6. The process of claim 1, wherein the separation step is performed in a vessel provided for the primary purpose of separating the liquid-gas mixture.

7. The process of claim 1, further comprising controlling a ratio between the cracked gas stream and the spent caustic stream.

8. A method for debottlenecking an ethylene plant limited by its caustic tower, comprising:
    installing a mixer for receiving a cracked gas stream upstream of the caustic tower;

installing a conveyance system between a source of caustic and the mixer for providing caustic to the mixer;

providing means for receiving and separating a mixture of the cracked gas stream and the caustic to form a partially treated cracked gas stream; and providing means for feeding the partially treated cracked gas stream to the caustic tower.

9. The method of claim 8, wherein the mixer is an inline mixer.

10. The method of claim 9, wherein the mixer is a static mixer or a venturi scrubber.

11. The method of claim 8, wherein the source of caustic is fresh caustic or spent caustic.

12. The method of claim 8, wherein the means for receiving and separating the mixture also forms a liquid stream and further comprising a separator for separating the liquid stream into a hydrocarbon stream and an aqueous stream.

13. A method for increasing the capacity of a caustic tower when constructing an ethylene plant, comprising:

installing a mixer for receiving a cracked gas stream upstream of the caustic tower;

installing a conveyance system between a source of caustic and the mixer for providing caustic to the mixer;

providing means for receiving and separating a mixture of the cracked gas stream and the caustic to form a partially treated cracked gas stream; and providing means for feeding the partially treated cracked gas stream to the caustic tower.

14. A process of treating a gas composition containing olefins and a content of acid gas components so as to condition said gas composition for removal therefrom of a substantial portion of said acid gas components by a gas-liquid contact thereof in a caustic scrubbing tower with a circulating caustic solution which, after such gas-liquid contact, accumulates as a tower bottom liquid dischargeable stream hereinafter to be referred to as a "tower spent caustic solution," comprising the steps of (a) contacting said gas composition in a high shear contactor with a caustic solution which is at least in part formed from said tower spent caustic solution;

(b) feeding said high shear contactor discharge composition to a gas-liquid separation vessel to form
  (1) a gas discharge stream for feeding to said caustic scrubbing tower, and
  (2) a liquid discharge stream hereafter referred to as a weakened caustic solution; and (c) combining said tower spent caustic solution with a sufficient quantity of said weakened caustic solution to form a caustic solution of a quantity sufficient as feed to said high shear contactor to affect therein a liquid-gas contact approaching one theoretical stage of liquid-gas contacting.

* * * * *